Feb. 15, 1966

J. A. FRYE 3,235,134

SECTIONAL FLOW CONTROL VALVE

Filed Jan. 6, 1964

INVENTOR.
JAMES A. FRYE

BY

ATTORNEYS

Feb. 15, 1966    J. A. FRYE    3,235,134
SECTIONAL FLOW CONTROL VALVE
Filed Jan. 6, 1964    2 Sheets-Sheet 2

INVENTOR.
JAMES A. FRYE

BY *Burns, Doane, Benedict, Swecker, & Mathis*

ATTORNEYS

United States Patent Office 3,235,134
Patented Feb. 15, 1966

3,235,134
SECTIONAL FLOW CONTROL VALVE
James A. Frye, Duncan, Okla., assignor to Halliburton Company, Duncan, Okla., a corporation of Delaware
Filed Jan. 6, 1964 Ser. No. 335,735
15 Claims. (Cl. 222—193)

This invention relates to valves and, in particular, to valves for the control of the flow of solid granular materials.

The invention is particularly useful for controlling the flow of finely divided or powdered materials such as Portland cement. Although dry powdery materials when thoroughly aerated flow easily under the influence of gravity through valves and ports, they tend after a period of static settlement to become compacted and dense. This is particularly true when such materials are stored in large weighty quantities and when they are subjected to vibration. Under these conditions such materials tend, through adherence to moving valve parts, to obstruct the opening of the valve and, through bridging of the valve opening, to block the flow path through the valve.

This invention has as a principal object to provide novel valves for controlling the flow of solid particle materials which valves are provided with self cleaning means to prevent obstruction of the valve by compactible materials and to lighten and improve the flowability of such materials.

It is a further object of the invention to provide novel valves having improved means for the positive aeration of flowable materials and for breaking up clumps of compacted materials which might otherwise clog the flow through such valves.

A still further object of the invention is to provide an improved valve structure of a modular form which contributes to the ease of construction, assembly and servicing of the valve.

In carrying out the invention in a preferred illustrative embodiment a valve is provided having a valve body formed of identical C-shaped halves fastened together to form a unitary structure having a flow passage therethrough. In each body half a valve-controlling rotor is journalled for opening and closing movement such that the face of each valve rotor passes transversely across the flow path. In the closed position the two rotors abut each other along edges parallel to their pivotal axes. The valve rotors are provided with porous cylindrical surfaces which extend across substantially the entire area of the flow path. The valve bodies are also provided with porous surfacings adjacent the rotors. Means are provided for introducing pressurized gases into spaces behind the porous surfaces to clean the porous surfaces of any adhering material and to break up clumps of compacted materials. The pressurized gases in passing through the various surfaces follow mutually intersecting paths within the powdered material adjacent the valve components thus insuring positive aeration of the material. After the application of pressurized gases in this manner the valve may then be opened by means which move the rotors in opposite directions to unblock the flow path.

Although the scope of this invention is not to be limited except by the appended claims, further details of the invention as well as additional objects and advantages will be better understood in connection with the following more complete description taken together with the accompanying drawings in which:

Figures 1, 2:
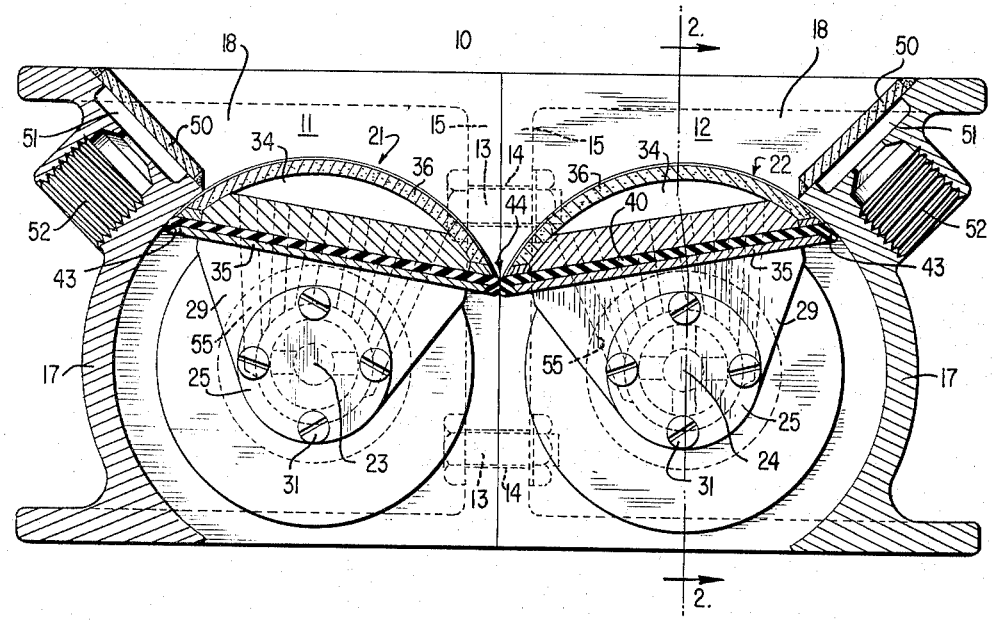
FIGURE 1 is a cross-sectional view of a valve for regulating the flow of solid particle material constructed in accordance with this invention.
FIGURE 2 is a cross-sectional view taken on line 2—2 of FIGURE 1.

Referring now to FIGURE 1 there is seen in cross-section a valve made in accordance with this invention having a valve body 10 formed of two symmetrical and reversible body halves 11 and 12 having a generally C-shaped configuration. These two halves are fastened together by bolts 13 passing through bolt openings 14 in the external flanges 15 to form of the two halves a unitary valve body assembly having a closable opening from the top to the bottom therethrough as a flow path for solid pulverulent material. The discharge path is enclosed at each side by side panels 17 and at the ends by end panels 18.

Mounted in the end panels of the valve body are a pair of valve controlling rotor assemblies 21 and 22. Both rotor assemblies are shown in valve closed positions extending across and sealing the discharge path through the valve body. Rotor assemblies 21 and 22 are each mounted for rotation on pivotal axes 23 and 24 respectively by pivotal shafts 25 and 26 which, as best seen in FIGURE 2, are journalled in bushings 27 and 28 in end panels 18. It is to be noted that shafts 25 and 26 do not extend across the discharge path where they would tend to obstruct the flow of material, but terminate instead just inside the end panels 18 of the valve body. On their internal ends the shafts 25 and 26 are fastened to the lever arms 29 and 30 of each rotor assembly. This is accomplished by bolts 31 which pass axially through a flange of shaft 25 and into lever arm 29 to clamp the two together and by a hex-headed shaft screw 32 threaded radially in lever arm 30 and bearing against shaft 26 at its innermost end. Connecting the tops of the lever arms of each rotor assembly is that portion of the assembly which acts as the valve closure member. These elongated valve closure members, which extend across the discharge path in the valve from end wall to end wall, are constructed hollow to create an air chamber 34 between the back plate 35 and the cylindrical valve facing 36.

Construction of the valve body in symmetrical mating halves, each mounting a valve-controlling rotor assembly gives rise to a number of special advantages. First of all, the castings necessary to produce the valve body of any given flow capacity are reduced in size by one-half and are thus more easily produced than if the body portion were a single one piece construction. In addition, the openness of each C-shaped body half permits ready access to the interior parts of the valve for final machining operations performed on the body and for assembly of the rotors into the valve body. Also, when it becomes necessary to inspect or repair parts of the valve, a simple disconnection of the two body halves from each other exposes the entire interior of the valve to instant accessibility.

The two rotor assemblies 21 and 22 are movable by means yet to be described in opposite directions about their pivotal axes from the valve closed positions shown to valve opened positions in which the cylindrical surfaces 36 are rotated to lie closely along the side panels 17. In the valve opened position the valve closure rotors are out of the discharge path and the back plates 35 define smooth side walls to present the least impediment to the flow of materials through the valve.

Around the perimeter of each valve closure member and held firmly thereon by mating configurations is a seal 40. At its opposite extremities 41 and 42 the valve seal presses against end walls 18 forming a sliding seal therewith. The outboard side 43 of each valve seal presses similarly against the respective side panel 17. When the valve rotors occupy the mutually abutting positions shown in FIGURE 1, the valve seals press firmly together at 44 to seal the entral opening. Rotor assemblies 21 and 22 together with their sealing elements completely block the passage of material through the valve when these members are in the position shown in FIGURES 1 and 2.

In the closed position of the valve, bulk granulated solids whose passage is blocked by the valve often tend to become dense and compact and may form a plug or bridge of compacted material across the discharge path. To prevent such a plug or bridge of densified material from obstructing the operation of the valve itself or interfering with the flow of material through the valve after it is open, a unique aeration system is provided. The internal surface of the valve body at the top of each side panel of the valve is provided with a porous panel 50 of sintered bronze or other material, which, while presenting an effective barrier to pulverized material will nevertheless permit gases to pass therethrough with relative ease. Behind panel 50 is a hollow air chamber 51 extending from end to end of the valve opening. Connecting with air chamber 51 is a threaded input opening 52 for directing air or other gases under pressure into the chamber 51. The cylindrical facing 36 of each of the valve rotor assemblies is also constructed of a porous material and, as best seen in FIGURE 2, pressurized air or other gases are admitted to the air chamber 34 behind the porous cylindrical facings 36 in the valve closure rotors through another threaded opening 53. This air is directed through and to the end of an axial opening 54 in the pivotal shaft 25 and from there radially outward through distributing channels 55 in the lever arm 29 into the space or chamber 34 behind the porous facing of the rotor. To prevent the leakage of pressurized gases, gaskets 56 and 57 and O-rings 58 and 59 seal the various bolted and rotary connections surrounding the inlet path of gases to the hollow rotors.

Before the valve is operated to open it from its closed position shown in FIGURES 1 and 2, pressurized gases are directed through the aforesaid inlet openings and to the back surfaces of porous facings 36 and 50, thence through these facings and into the pulverized solid material above the valve. It is to be noted that the path taken by the gases escaping through the facing 50 converges directly with the path of gases through the adjacent intersecting surfaces of facing 36, because of the angular inwardly directed relationship between the porous facing surfaces at their adjacent edges. Similarly, at the center of the discharge path the surfaces of porous facings 36 on the one rotor 21 are disposed in angularly intersection relationship to the adjacent porous facing 36 on the other rotor 22. Consequently, the pressurized gases escaping through the two facings of the rotors are also directed in inwardly converging relationship through the material immediately above the valve. The effect of the convergence of the escaping gases upon the bulk material disposed above the valve facings is to direct those gases jet-like into the portions of the material where bridging is most likely to occur. This action breaks up any chunks of the bulk material which may have formed and lightens it to ease the flow of the granulated solids after the valve opens. In addition, the flow of air through the facings 36 of the valve rotor assemblies cleans the surfaces of these members of material which might otherwise adhere thereto and interfere with the movement of the rotor assemblies. Surfaces 36 can therefore be rotated with relative ease transverse to the flow path to pass beneath the sloping porous surface 50 to an open position in which it lies closely alongside the inner surface of side panel 17.

Thus, not only is the flowability of the material improved but the movement of the valve parts is also enhanced.

Figure 3:
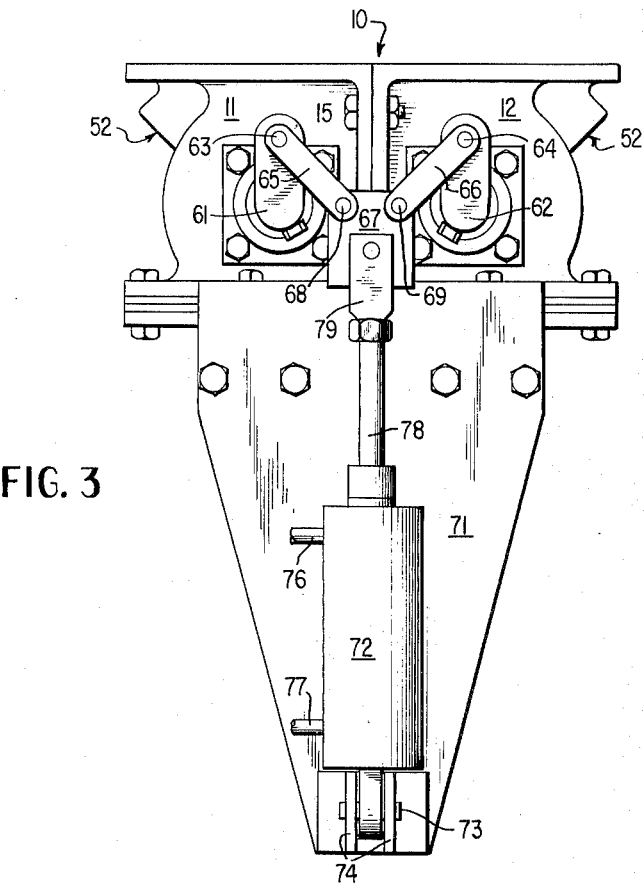
FIGURE 3 is an end view of the valve shown in FIGURES 1 and 2 with a valve operating mechanism attached thereto.

After the pressurized gas is directed through the porous facings as described, the rotor assemblies 21 and 22 are pivoted to their open positions. This is accomplished by rotation of the operating shafts 26 of the rotor assemblies in opposite directions. One of the preferred arrangements for moving the valve closure members in opposite directions is shown in FIGURE 3 which is an end view of the valve as seen from the end through which the operating shafts project. The projecting ends of these shafts have affixed thereto operating arms 61 and 62 respectively. These in turn are joined at their extremities through pivotal connections 63 and 64 to a pair of links 65 and 66 connected to a common connecting block 67 by pivotal connections 68 and 69. Downward movement of the connecting block 67 draws both of the links 65 and 66 downward with it and rotates the operating arms 61 and 62 inwardly toward each other to effect valve closing movements of the rotor assemblies within the valve housing. Movement of the connecting block in the reverse direction to the position shown in FIGURE 3 opens the valve.

Affixed to the valve body 10 is a mounting plate 71 for a pneumatic air cylinder 72. One end of the pneumatic cylinder is connected through a connection provided by clevis pin 73 to a bifurcated bracket 74 affixed at the lower end of the mounting bracket 71. Movements of the piston within the air cylinder are accomplished by admitting air under pressure selectively through ports 76 or 77 into the cylinder above or below the piston, and the resulting piston movements are translated by rod 78 and the connecting yoke 79 to which it is attached to valve operating movements of the connecting block 67.

Figure 4:
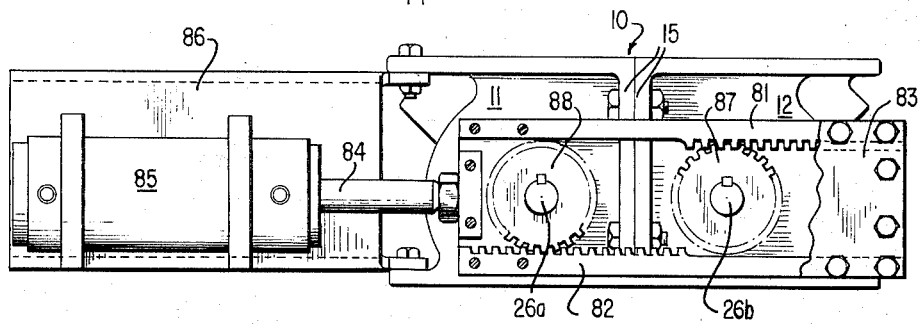
FIGURE 4 is a view similar to that of FIGURE 3 with an optional valve operation mechanism attached to the valve structure.

In the alternative valve operating mechanism shown in FIGURE 4, the operating shafts 26a and 26b are rotated in opposite directions with respect to each other by a rack and pinion assembly. This includes two rack gears 81 and 82 mounted parallel to and facing each other in a framework 83 which is attached to the piston rod 84 of a linear acting hydraulic cylinder 85. Hydraulic cylinder 85 is mounted on a mounting plate 86 fastened to the body 10 of the valve assembly. In the embodiment shown the upper rack gear 81 engages only the righthand pinion 87 on shaft 26b and the lower rack gear 82 engages only pinion 88 on shaft 26a. In this manner, a linear movement of the piston rod 84 under the influence of the pneumatic piston in cylinder 85 is translated into identical counter-rotating movements of the two operating shafts. This rack and pinion operating connection is particularly useful in those valve installations where the overall height of the valve and its operating mechanism is limited because of space factors.

It should be understood, however, that many other valve operating mechanisms could be employed in the practice of this invention. The valve might be operated hydraulically, electrically or manually and the valve assembly could be opened or closed in adjustable increments by a variable actuator for controlling the rate of flow of the materials therethrough. Indeed, the embodiments of this invention specifically disclosed herein are offered by way of illustration of the principles of this invention and they should not be interpreted necessarily as limiting the application of these teachings. Since it will be obvious to those skilled in the art that various other modifications may be made without departing from the invention in its broader aspects, it is intended that the appended claims should encompass all such modifications as fall within the true spirit and scope of the invention.

What is claimed is:

1. A valve for regulating the gravity flow of solid particle material comprising:
   a pair of relatively movable valve members having porous facings thereon;
   means for selectively varying the relative positions of said valve members from valve open to valve closed positions; and
   means for directing a gas under pressure through both of said porous facings to clean the surfaces of said facings and aerate said material prior to a change in the relative positions of said valve members;
   the porous facings of said valve members being angularly opposed adjacent each other and facing in a direction to block the flow of solid particle material through said valve when said valve members are in the valve closed position, said porous facings being withdrawn from angular opposition when said valve members are in the valve open position;
   whereby said gas enters said material along mutually intersecting pathways.

2. A valve for regulating the gravity flow of solid particle material comprising:
   a valve body having an opening therethrough defining a flow path for said solid particle materials;
   a pair of symmetrical valve closure members pivotally mounted in said valve body on spaced apart pivotal axes, said closure members having cylindrical valve faces of a porous material sufficiently dense to prevent the passage of particles of said materials therethrough while permitting gases to pass therethrough;
   means for controllably moving said closure members about their respective pivotal axes from mutually abutting closed positions in which said closure members extend across and seal said flow path to spaced apart open positions removed from said flow path; and
   means for directing a gas under pressure through said cylindrical surfaces in a direction opposite to the flow of materials through said flow path,
   said cylindrical valve faces of said closure members being disposed in angular mutually opposed relationship when said closure members are in said closed positions;
   whereby said gas passes through said valve faces of said valve closure members and enters said material along mutually converging pathways.

3. A valve for regulating the gravity flow of solid particle materials comprising:
   a valve body having an opening therethrough defining a flow path for said solid particle materials;
   a pair of valve closure members mounted movably in said valve body, said closure members having porous valve faces sufficiently dense to prevent the passage of particles of said materials therethrough while permitting gases to pass therethrough;
   means for controllably moving said closure members from mutually abutting closed positions in which said closure members extend across and seal said flow path to spaced apart open positions removed from said flow path; and
   means for directing a gas under pressure through said cylindrical surfaces in a direction opposite to the flow of materials through said flow path,
   said valve faces of said closure members being disposed in angular mutually opposed relationship when said closure members are in said closed positions;
   whereby said gas passes through said valve faces of said valve closure members and enters said material along mutually converging pathways.

4. A valve for regulating the gravity flow of solid particle materials comprising:
   a valve body having an opening therethrough defining a flow path for said solid particle materials and having porous surfaces on the inlet side thereof sloping inwardly toward the center of said flow path;
   a pair of symmetrical valve closure members pivotally mounted in said valve body on spaced apart pivotal axes, said closure members having cylindrical porous valve surfaces;
   means for controllably moving said closure members about their respective pivotal axes between mutually abutting closed positions in which said closure members extend across and seal said opening and spaced apart open positions removed from said flow path, and
   means for directing a gas under pressure through said porous surfaces in a direction opposite to the flow of materials through said flow path,
   said cylindrical valve surfaces of said closure members being disposed in angular opposed relationship with respect to each other and with respect to the porous surfaces on said valve body when said closure members are in said closed positions;
   whereby said gas passes through said porous surfaces and enters said material along mutually intersecting pathways.

5. A valve for regulating the gravity flow of solid particle material comprising:
   a valve body formed of two symmetrical body halves fastened together to extend around a central flow path on respectively opposite sides thereof;
   a pair of symmetrical valve closure members, each pivotally mounted in a respective one of said body halves for movement between valve open positions and valve closed positions and each abutting the other at a central part of said flow path when in said valve closed positions;
   each of said closure members having a porous cylindrical blocking surface movable with said members transverse to said flow path and extending across substantially the entire area of said flow path when in said closed positions, said porous surfaces being sufficiently dense to prevent the passage of particles of said material therethrough while permitting gases to pass therethrough;
   said cylindrical blocking surfaces of said closure members being disposed in angular mutually opposing relationship when said closure members are in said closed positions; and
   means for directing a gas under pressure through said cylindrical surfaces in a direction opposite to the flow of materials through said flow path to clean said blocking surfaces and loosen the material controlled by said valve.

6. A valve for regulating the gravity flow of solid particle material comprising:
   a valve body formed of two symmetrical body halves fastened together to extend around a central flow path on respectively opposite sides thereof, said body halves each having a porous surface on the inlet side thereof sloping inwardly toward the center of said flow path;
   a pair of symmetrical valve closure members, each pivotally mounted in a respective one of said body halves for movement between valve open positions and valve closed positions and each abutting the other at a central part of said flow path when in said valve closed positions;
   each of said closure members having a porous cylindrical blocking surface movable with said members transverse to said flow path and extending across substantially the entire area of said flow path when in said closed positions, said porous surfaces of said body halves and said closure members being sufficiently dense to prevent the passage of particles of said material therethrough while permitting gases to pass therethrough;
   said cylindrical blocking surfaces of said closure members being disposed in angular opposing relationship with respect to each other and with respect to the porous surfaces of said body halves when said closure members are in said closed positions; and means for directing a gas under pressure through said cylindrical surfaces in a direction opposite to the flow of materials through said flow path to clean said blocking surfaces and loosen the material controlled by said valve.

7. A valve comprising:

a valve body formed of two symmetrical body halves fastened together, said body halves extending around a central flow path on respectively opposite sides thereof;

a pair of syymetrical valve closure members having porous and permeable, material blocking, surface means;

means mounting said valve closure members in respective ones of said body halves for valve controlling movements therein; and means for moving said closure members in opposite directions thereby to move said porous and permeable, material blocking surface means generally transverse to said flow path between valve open positions out of said flow path and valve closed positions in which said members extend inwardly across said flow path from opposite sides thereof, said closure members when in said valve closed positions abutting each other in the central part of said flow path;

fastening means detachably securing said body halves whereby said body halves may be separated generally transversely of said flow path; and means for placing said surface means in fluid communication with a source of pressurized fluid.

8. A valve comprising:

a valve body formed of two generally C-shaped symmetrical body halves fastened together, said body halves extending around a central flow path on respectively opposite sides thereof;

a pair of symmetrical valve closure members having arcuate, porous and permeable, material blocking surfaces;

means including pivotal shafts mounting said valve closure members in respective ones of said body halves for valve controlling movement therein; and means for moving said closure members in opposite directions about their pivotal axes thereby to move said arcuate, porous and permeable, material blocking surfaces in directions generally transverse to said flow path between valve open positions beside said flow path and adjacent respective walls of said body halves and valve closed positions in which said blocking surfaces extend inwardly across said flow path from opposite sides thereof, said closure members when in said valve closed positions abutting each other in the central part of said flow path;

fastening means detachably securing said body halves whereby said body halves may be separated generally transversely of said flow path; and means for placing said surface means in fluid communication with a source of pressurized fluid.

9. A valve for regulating the gravity flow of solid particle material comprising:

a valve body formed to extend around a central flow path;

a pair of symmetrical valve closure members, said closure members each having a porous blocking surface and having behind said surface an air chamber;

means mounting said valve closure members in said valve body for valve controlling movements therein;

means for moving said closure members in opposite directions about their pivotal axes thereby to move said porous blocking surfaces in directions generally transverse to said flow path between valve open positions beside said flow path and valve closed positions in which said porous blocking surfaces extend inwardly across said flow path from opposite sides thereof, said closure members when in said valve closed positions abutting each other in the central part of said flow path, the porous surfaces of said closure members when in closed positions extending into angularly opposed relationship with each other; and means for introducing pressurized gases into said air chambers and thence through said porous blocking surfaces, whereby said gases clean said surfaces of materials adhering thereto and pass into said material along mutually intersecting pathways to lighten such material and ease its flow through said valve.

10. A valve for regulating the gravity flow of solid particle material comprising:

a valve body formed of two symmetrical body halves fastened together, said body halves extending around a central flow path on respectively opposite sides thereof;

each of said body halves having adjacent said flow path on the inlet side thereof a porous facing sloping inward toward the center of said flow path, and having behind said facing an air chamber;

a pair of symmetrical valve closure members, said closure members each having a porous blocking surface and having behind said surface an air chamber;

means mounting said valve closure members in respective ones of said body halves for valve controlling movements therein;

means for moving said closure members in opposite directions thereby to move said porous blocking surfaces in directions generally transverse to said flow path between valve open positions beside said flow path and valve closed positions in which said porous blocking surfaces extend inwardly across said flow path from opposite sides thereof, said closure members when in said valve closed positions abutting each other in the central part of said flow path, the porous surfaces of said closure members when in closed positions extending into angularly opposed relationship with each other and with the porous facings in their respectively associated body halves; and means for introducing pressurized gases into said air chambers and thence through said porous blocking surfaces and said porous facings, whereby said gases clean said facings and surfaces of material adhering thereto and enter such material along angularly intersecting pathways to ease the flow of materials through said valve.

11. A valve for regulating the gravity flow of solid particle material comprising:

a valve body formed of two symmetrical body halves fastened together, said body halves extending around a central flow path on respectively opposite sides thereof;

a pair of symmetrical valve closure members, said closure members each having a cylindrical porous blocking surface and having behind said surface an air chamber;

means including pivotal shafts mounting asid valve closure members in respective ones of said body halves for valve controlling movements therein;

means for moving said closure members in opposite directions about their pivotal axes thereby to move said cylindrical porous blocking surfaces in directions generally transverse to said flow path between valve open positions beside said flow path and adjacent respective walls of said body halves and valve closed positions in which said porous blocking surfaces extend inwardly across said flow path from opposite sides thereof, said closure members when in said valve closed positions abutting each other in the central part of said flow path, the porous cylindrical surfaces of said closure members when in closed positions extending into angularly opposed relationship with each other; and means for introducing pressurized gases into said air chambers and thence through said porous blocking surfaces, whereby said gases clean said surfaces of material adhering thereto and enter such material along angularly intersecting pathways to ease the flow of materials through said valve.

12. A valve for regulating the gravity flow of solid particle material comprising:
   a valve body formed of two symmetrical body halves fastened together, said body halves extending around a central flow path on respectively opposite sides thereof;
   a pair of symmetrical valve closure members, said closure members each having a cylindrical porous blocking surface and having behind said surface an air chamber;
   means including pivotal shafts mounting said valve closure members in respective ones of said body halves for valve controlling movements therein;
   means for moving said closure members in opposite directions about their pivotal axes thereby to move said cylindrical porous blocking surfaces in directions generally transverse to said flow path between valve open positions beside said flow path and adjacent respective walls of said body halves and valve closed positions in which said porous blocking surfaces extend inwardly across said flow path from opposite sides thereof, said closure members when in said valve closed positions abutting each other in the central part of said flow path, the porous cylindrical surfaces of said closure members when in closed positions extending into angularly opposed relationship with each other; and
   means for introducing pressurized gases into said air chambers and thence through said porous blocking surfaces including air passages extending axially through at least one of the shafts of each of said closure members and into the air chambers in said closure members,
   whereby said gases clean said surfaces of materials adhering thereto and enter said material along mutually intersecting pathways to lighten such material and ease the flow of materials through said valve.

13. A valve for regulating the gravity flow of solid particle material comprising:
   a valve body formed to extend around a central flow path;
   said valve body having adjacent said flow path on the inlet side thereof porous facings sloping inward toward the center of said flow path, and having air chambers behind said facings;
   a pair of symmetrical valve closure members each having a cylindrical porous blocking surface and having behind said surface an air chamber;
   means including pivotal shafts mounting said valve closure members in said valve body for valve controlling movements therein;
   means for moving said closure members in opposite directions about their pivotal axes thereby to move said cylindrical porous blocking surfaces in directions generally transverse to said flow path between valve open positions beside said flow path and adjacent opposite walls of said valve body and valve closed positions in which said porous blocking surfaces extend inwardly across said flow path from opposite sides thereof, said closure members when in said valve closed positions abutting each other in the central part of said flow path, the porous cylindrical surfaces of said closure members when in closed positions extending into angularly opposed relationship with each other and with said porous facings; and
   means for introducing pressurized gases into said air chambers and thence through said porous blocking surfaces and said porous facings, whereby said pressurized gases clean said facings and surfaces of material adhering thereto and pass through said facings and surfaces along plural mutually intersecting pathways to loosen said material and ease its flow through said valve.

14. A valve for regulating the gravity flow of solid particle material comprising:
   a valve body formed of two symmetrical body halves fastened together, said body halves extending around a central flow path on respectively opposite sides thereof;
   each of said body halves having adjacent said flow path on the inlet side thereof a porous facing sloping inward toward the center of said flow path, and having behind said facing an air chamber;
   a pair of symmetrical valve closure members each having a cylindrical porous blocking surface and having behind said surface an air chamber;
   means including pivotal shafts mounting said valve closure members in respective ones of said body halves for valve controlling movements therein;
   means for moving said closure members in opposite directions about their pivotal axes thereby to move said cylindrical porous blocking surfaces in directions generally transverse to said flow path between valve open positions beside said flow path and adjacent respective walls of said body halves and valve closed positions in which said porous blocking surfaces extend inwardly across said flow path from opposite sides thereof, said closure members when in said valve closed positions abutting each other in the central part of said flow path, the porous cylindrical surfaces of said closure members when in closed positions extending into angularly opposed relationship with each other and with the porous facings in their respectively associated body halves; and
   means for introducing pressurized gases into said air chambers and thence through said porous blocking surfaces and said porous facings, whereby said gases clean said surfaces and facings of material adhering thereto and pass into said material along intersecting pathways to ease the flow of materials through said valve.

15. A valve for regulating the gravity flow of solid particle material comprising:
   a valve body formed of two generally C-shaped symmetrical body halves fastened together, said body halves extending around a central flow path on respectively opposite sides thereof;
   each of said body halves having adjacent said flow path on the inlet side thereof a facing of porous material sloping inward toward the center of said flow path, and having behind said facing an air chamber;
   a pair of symmetrical valve closure members, said closure members each having a cylindrical porous blocking surface and having behind said surface an air chamber;
   means including pivotal shafts mounting said valve closure members in respective ones of said body halves for valve controlling movements therein;
   means for moving said closure members in opposite directions about their pivotal axes thereby to move said cylindrical porous blocking surfaces in directions generally transverse to said flow path between valve open positions beside said flow path and adjacent respective walls of said body halves and valve closed positions in which said porous blocking surfaces extend inwardly across said flow path from opposite sides thereof, said closure members when in said valve closed positions abutting each other in the central part of said flow path; the porous cylindrical surfaces of said closure members when in closed positions extending into angularly opposed relationship with each other and with the porous facings in their respectively associated body halves; and
   means for introducing pressurized gases into said air chambers and thence through said porous blocking surfaces and said porous facings, said introducing means including air passages extending axially through at least one of the shafts of each of said closure members and into the air chambers in said closure members, whereby said gases clean said surfaces of materials adhering thereto and enter said material along mutually intersecting pathways to lighten such material and ease the flow of materials through said valve.

References Cited by the Examiner

UNITED STATES PATENTS

| | | | |
|---|---|---|---|
| 1,967,845 | 7/1934 | Streun | 222—503 |
| 2,209,115 | 7/1940 | Fitzgerald | 222—503 |
| 2,672,262 | 3/1954 | Gross et al. | 222—503 |

LOUIS J. DEMBO, *Primary Examiner.*